Oct. 18, 1960 E. STAUDT 2,956,490
FLASH CONTACT CONTROL FOR SINGLE-LENS REFLEX CAMERAS
Filed Aug. 24, 1959 2 Sheets-Sheet 1

Erwin Staudt
INVENTOR.

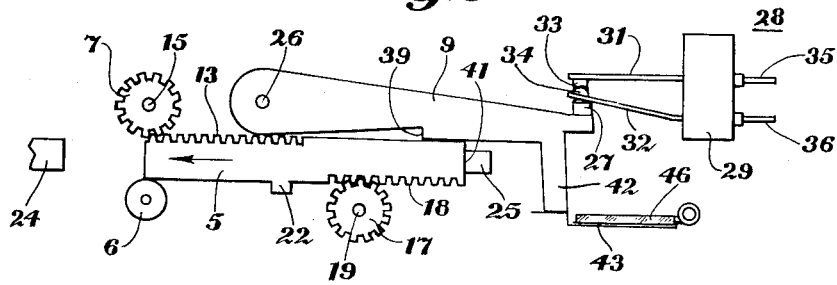
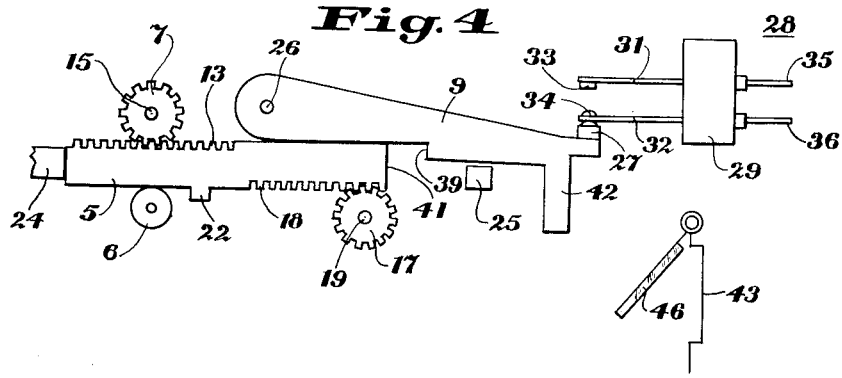
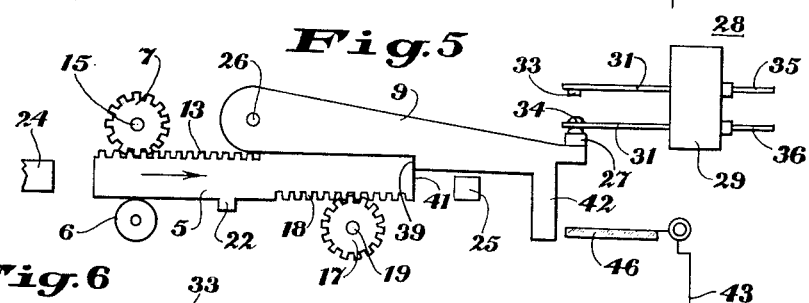
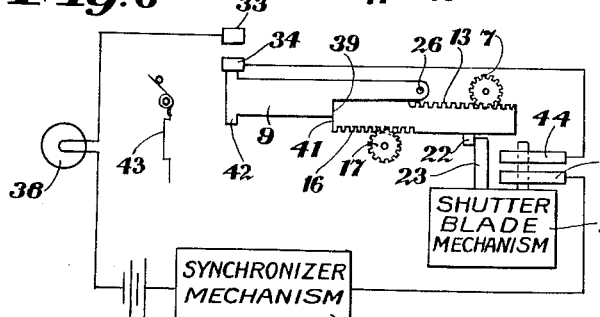

United States Patent Office 2,956,490
Patented Oct. 18, 1960

2,956,490

FLASH CONTACT CONTROL FOR SINGLE-LENS REFLEX CAMERAS

Erwin Staudt, Stuttgart, Germany, assignor to Eastman Kodak Company, Rochester, N.Y., a corporation of New Jersey Filed Aug. 24, 1959, Ser. No. 835,683

Claims priority, application Germany Aug. 26, 1958

13 Claims. (Cl. 95—11.5)

This invention relates generally to cameras, and more specifically to a switch control device for the flash synchronizer mechanism of a single-lens reflex camera.

Reflex cameras having a shutter releasable by the mirror as it travels from an operative light-blocking position in which it intercepts light rays passing through the objective to a normal inoperative position in which it is removed from the path of the light rays are well known. The mirror is said to be in an operative position when it is disposed in a plane at an angle of 45° with respect to the optic axis of the shutter objective lens, and reflects the image formed by the objective lens through a viewing screen. The mirror is in an inoperative position when it has been tilted upwardly out of the path of the light rays which are free to strike the light-sensitive photographic material. Now in reflex cameras of the type indicated, operation of the film-winding mechanism for advancing the film automatically causes the mirror and light-blocking flap to be moved into their operative positions, the shutter to be cocked and the shutter blades to be moved into an intermediate wide-open position so that the operator may view the scene desired to be photographed on the viewing screen. Although these operations are all accomplished by the operation of the film-winding mechanism, they are of course operated in timed relation so that the mirror and light-blocking flap are in a light-blocking position before the shutter blades are opened. Once the operator is satisfied with the scene to be photographed, the camera release button is depressed automatically causing the shutter blades to close, the mirror and flap to be moved into their inoperative positions, and the shutter to be released to make an exposure. Once again, these operations are carried on in timed relation so that the shutter blades are closed before the mirror and flap are moved out of their light-blocking position, and the shutter opened and closed to make an exposure after the mirror and flap are in their inoperative positions. A reflex camera of this general type is disclosed in U.S. applications Serial Nos. 577,681 and 692,357 by Paul G. Harter and Erwin E. Staudt, now Pat. Nos. 2,916,978 and 2,925,023; and U.S. application Serial No. 692,466 by Paul G. Harter, now Patent No. 2,920,544.

The provision of a flash lamp attachment for cameras actuable by a flash synchronizer shutter mechanism is well known in the art. In cameras of this type, every time the shutter mechanism opens the shutter blades to make an exposure, the flash synchronizer mechanism is actuated connecting an electric current source to the lamp which flashes illuminating the subject for the exposure. Flash mechanisms of this type operate satisfactorily for most cameras, but cannot be incorporated satisfactorily in reflex cameras of the type indicated above because every time the operator operates the film-winding mechanism for advancing the film and opening the shutter blades so that the operator may view the scene desired to be photographed, the opening of the shutter blades by the shutter mechanism also completes the flash circuit causing the lamp to flash prematurely. Although some devices are known in the art to prevent the lamp from flashing when the operator opens the shutter blades for observing the scene to be photographed, these devices are objectionable in that they are extremely complicated and costly, and further present a difficult problem with respect to designing the device so that its parts all function effectively in proper timed relation. Applicant's improved flash control mechanism for a reflex camera for preventing the lamp from flashing while the shutter blades are opened by the shutter mechanism for observance of the scene to be photographed is believed to obviate these and other disadvantages of prior-known flash control mechanisms.

Therefore, one of the primary objects of this invention is to provide an improved flash control mechanism for a reflex camera that is of simple design and construction, thoroughly reliable and efficient in operation, and economical to manufacture.

Another object of this invention is to provide an improved flash control mechanism for a camera having a switch connected to the flash synchronizer mechanism in the shutter and adapted, when opened, to prevent the lamp from flashing even though the flash synchronizer mechanism is in a position for flashing the lamp.

A further object of this invention is to provide an improved flash control mechanism for a camera having a switch connected in series with the flash synchronizer mechanism and movable between an open position electrically disconnecting the shutter flash mechanism from the lamp to a closed position electrically connecting the shutter flash mechanism to the lamp.

A more specific object of this invention is to provide an improved flash control mechanism for a reflex camera having a switch adapted in its open position to urge an escapement mechanism into one position for releasably holding the shutter from completing its run-down after the camera release button has been depressed, said escapement mechanism adapted to be moved by the light-blocking flap of the camera from the first position into a second position, releasing the shutter and closing the switch.

A further important object of this invention is to provide an improved flash control mechanism for a camera having a switch closable by a movable member of the camera in which any rebound of the switch contacts tending to break the switch connection is eliminated.

Objects and advantages other than those set forth above will be apparent from the following description when read in connection with the accompanying drawing, in which:

Fig. 3 is an enlarged diagrammatic view in elevation showing the position of the flash control mechanism of Fig. 2 after the shutter mechanism has completely run down in making an exposure;

Fig. 4 is a view similar to Fig. 3 showing the position of the flash control mechanism after the film has been advanced and shutter cocked by the film winding mechanism;

Fig. 5 is a view similar to Fig. 3 showing the position of the flash control mechanism shortly after the shutter has been released; and Fig. 6 is a schematic and diagrammatic view showing the flash control mechanism in connection with the shutter, synchronizer mechanism and lamp.

Figure 1:
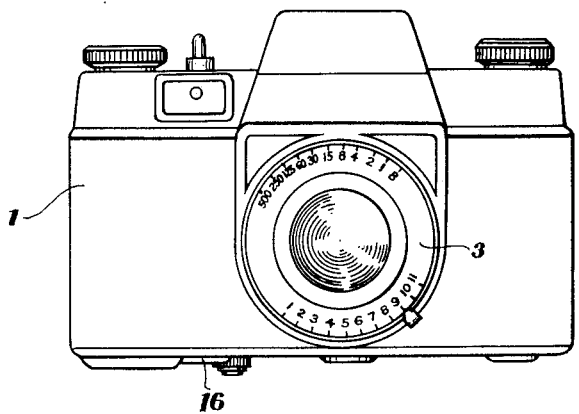
Fig. 1 is a front elevation view of a single lens reflex camera in which a preferred embodiment of the invention is incorporated.

As shown in the drawings, this invention is embodied in a single-lens reflex camera 1 having a shutter-mounting plate 2 secured thereto to which a shutter 3 may be detachably secured. The shutter 3 is a commercially available item generally referred to in the trade as the Synchro-Compur Shutter and is adapted, when released from a cocked position in which the shutter blades 4 are open for focusing purposes, to run down initially closing the shutter blades 4, and then opening and closing them to make an exposure, as is well known.

Figure 2:
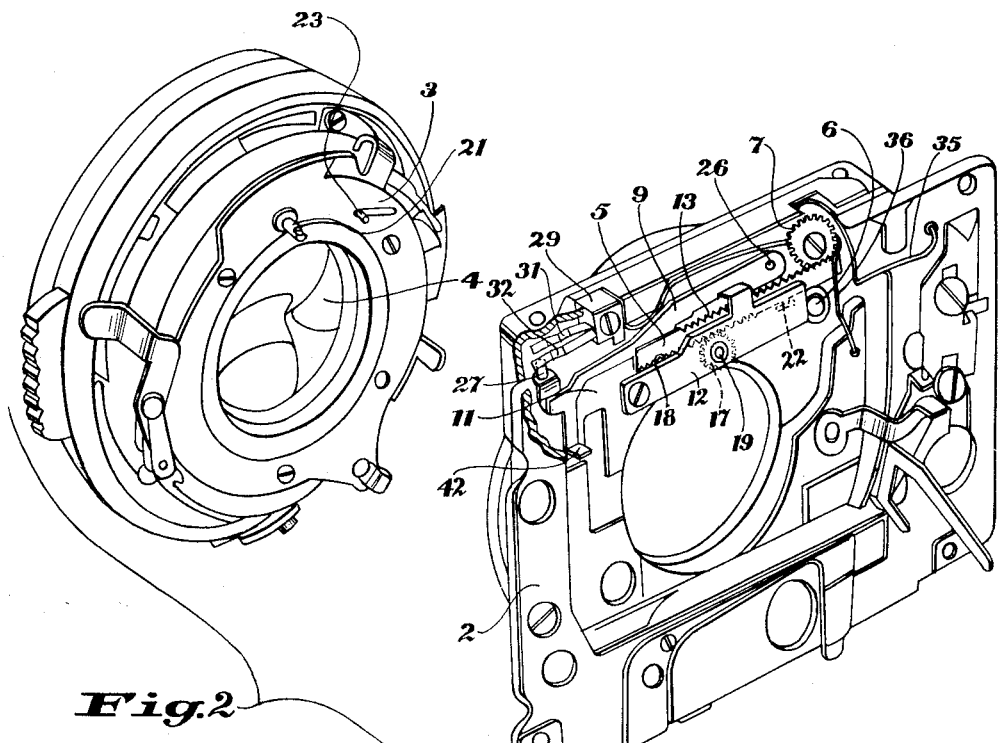
Fig. 2 is an exploded view in perspective of the shutter and shutter-mounting plate of the reflex camera of Fig. 1.

The flash control mechanism comprises a reciprocally movable gear rack 5 that is guided for reciprocal movement by a guide roller 6 and gear 7 engaging opposite sides of gear rack 5 at one end, and a gear 8 and lever 9 engaging opposite sides of the other end of rack 5. The gear rack 5 is held in slidable engagement with a face 11 of shutter-mounting plate 2 by means of a hold-down member 12 screwed to plate 2, as seen in Fig. 2. The gear 7 which engages a toothed portion 13 of gear rack 5 is mounted on a shaft 15 which is connected to the film-winding mechanism of which only a winding lever 16 is shown in Fig. 1. The film-winding mechanism is of a known type and is described in detail in the above-identified pending U.S. patent applications. A gear 17 is in engagement with another toothed portion 18 of gear rack 5 and is rigidly secured to a spindle 19 journaled in a bearing, not shown. The spindle 19 has a coupling at one end, not shown, for drivingly connecting gear 17 and spindle 19 to a shutter-cocking shaft 21 as seen in Fig. 2 when shutter 3 is secured to mounting plate 2. Once again, the mechanism for driving gear 7 and shaft 15 is not shown since it does not form a part of the present invention, and is further described and shown in the above-identified U.S. applications. A lug 22 is provided on rack 5 and is adapted when the rack is moved in the direction of the arrow in Fig. 3 to engage a shutter ring pin 23 as seen in Fig. 2 for moving shutter blades 4 into an open position for focusing. Stop members 24, 25 are provided adapted to engage opposite ends of rack 5 for limiting the travel of rack 5 in either direction.

The lever 9 is pivoted about a stud 26 at one end and has an insulating block 27 secured to the opposite end. A control switch 28 comprises an insulating block 29 secured to mounting plate 2 by a screw and includes a pair of spaced-apart leaf springs 31, 32 having spaced apart contact points 33, 34 respectively facing one another. The lower leaf spring 32 is mounted so that its free end is constantly in engagement with insulating block 27 and is under tension tending to urge lever 9 downwardly about its pivot 26. The leaf springs 31, 32 are connected to lead wires 35, 36 respectively which are in turn electrically connected to a shutter synchronizing mechanism 37 shown diagrammatically in Fig. 6 when the shutter 3 is secured to mounting plate 2. The shutter synchronizing mechanism 37 is of any known type adapted when the shutter mechanism is operated to open shutter blades 4 to complete an electrical circuit to a flash lamp 38. The leads 35, 36 are connected in series with synchronizing mechanism 37 and flash lamp 38 so that the electrical circuit thereto is not complete until contacts 33, 34 are closed. As indicated heretofore, this is necessary in a reflex camera because every time shutter blades 4 are opened to permit the operator to view the scene to be photographed, a flash lamp 38 electrically connected to camera 1 would be connected to the electric current source and fired prematurely.

The lever 9 has an escapement comprising a shoulder 39 adapted to cooperate with the front edge 41 of gear rack 5. The gear rack 5 and lever 9 are mounted on plate 2 in the same plane, and lever 9 further has a leg 42 engageable by a light-blocking flap 43 as it is moved from its operative or light-blocking position as seen in Fig. 3 to its inoperative position, seen in Fig. 4 when released by the shutter release mechanism, not shown. The flap 43 in its operative position urges lever 9 counter- clockwise about its pivot 26 withdrawing shoulder 39 from the path of gear rack 5 and closes contacts 33, 34 as seen in Fig. 3. The flap 43 and gear rack 5 operate in timed relation upon release of shutter 3, and initially gear rack 5 is driven by gear 17 causing lug 22 to release pin 23 and shutter blades 4 which are moved by their spring into the closed position. As blades 4 begin to close, pin 23 disconnects contacts 44, 45. The edge 41 of rack 5 strikes shoulder 39 stopping the shutter run down with blades 4 in their closed position. At this point, flap 43 strikes leg 42 withdrawing shoulder 39 from in front of rack 5 permitting shutter 3 to complete its run down causing shutter blades 4 to open and close to make an exposure. As soon as blades 4 open during the exposure, contacts 44, 45 are closed completing the electrical circuit to flash lamp 38 firing it. Although applicant is relying on movable flap 43 to close contacts 33, 34, it should be understood that any other movable camera member such as the mirror 46 may be used for accomplishing this purpose. Since the light-blocking flap 43, mirror 46, and shutter release mechanism are well known parts of a reflex camera and are described in detail in the above-noted applications, they are only diagrammatically presented in the drawings.

In the operation of this invention, let us assume initially that the operator operates lever 9 of the film-winding mechanism for advancing the film one frame. During the film-winding operation, gear 7 is rotated in a clockwise direction as seen in Fig. 3, moving rack 5 in the direction of the arrow up against stop 24 as seen in Fig. 4. As rack 5 is moved, gear 17 is rotated, cocking shutter 3 and lug 22 engages pin 23 for moving pin 23 and shutter blades 4 as seen dotted in Fig. 6 into a wide-open position. When the film has been completely advanced, shutter blades 4 are in the wide-open position, shutter 3 is cocked and mirror 46 and light-blocking flap 43 are in their operative positions as seen in Fig. 4. The operator may then view the scene to be photographed, and when he is satisfied with the scene, depresses the camera release button to make an exposure. Immediately, shutter 3 is released and the shutter spring drives gear 17 in a clockwise direction as seen in Fig. 3 moving gear rack 5 in the direction of the arrow seen in Fig. 5. As soon as the shutter run-down has progressed sufficiently to close shutter blades 4, the front edge of gear rack engages shoulder 39 preventing further run-down of shutter 3. As soon as the shutter blades are closed, mirror 46 is released which in turn releases light-blocking flap 43 as it is being urged by its spring into its inoperative position. As soon as light-blocking flap 43 is released, it is urged by its spring into its inoperative position causing its free end to strike leg 42 pivoting lever 9 in a counterclockwise direction, withdrawing shoulder 39 from the path of gear rack 5 and closing contacts 33, 34 of switch 28. Since flap 43 is constantly under spring tension tending to urge it in a clockwise direction, this tension tends to hold switch contacts 33, 34 together and effectively prevents any rebound of the contacts tending to break them apart. The shutter spring then continues to drive shutter 3 through its run-down motion opening and closing shutter blades 4 to make an exposure. Very shortly after shutter blades 4 begin to open, depending upon the shutter synchronizing mechanism, the electric circuit to flash lamp 38 is completed and lamp 38 fired to illuminate the subject.

The invention has been described in detail with particular reference to preferred embodiments thereof, but it will be understood that variations and modifications can be effected within the spirit and scope of the invention as described hereinabove and as defined in the appended claims.

I claim:

1. In a switch control device for a single lens reflex camera of the type having a camera body, a shutter having shutter blades movable between open and closed positions and adapted during the shutter run down to move into the closed position and then to open and close to make an exposure, a flash synchronizing mechanism associated with said shutter, an objective, and a spring urged light blocking flap pivoted within said body to move upon release of said shutter between an operative position in which it intercepts light rays passing through the objective, and a normal inoperative position in which it is removed from the path of said light rays, the combination comprising: means for simultaneously cocking said shutter, moving said flap into its operative position, and moving said shutter blades to their open position; a switch electrically connected to said flash synchronizing mechanism; and means associated with said first mentioned means and said switch and movable into a normal first position for opening said switch and stopping said first mentioned means a predetermined time interval after the release of said shutter, said predetermined time interval being sufficient to permit said shutter blades to move into their closed position, said means further being engaged by said flap and moved from said first position to a second position as said flap is moved into its inoperative position upon said release of said shutter whereby said switch is closed and said first mentioned means released permitting said shutter to continue its run down movement opening and closing the shutter blades to make an exposure.

2. The invention according to claim 1 wherein said first mentioned means comprises a reciprocally movable gear rack.

3. The invention according to claim 2 wherein said rack drives a gear for cocking said shutter, and further has a projection adapted upon movement of said rack to urge the shutter blades into their open position.

4. The invention according to claim 2 wherein said second mentioned means comprises a movable lever having escapement means for stopping said first mentioned means upon release of said shutter when said shutter blades are in their closed position, said movable lever further having a portion thereof in engagement with said switch and another portion thereof adapted to be engaged by said flap.

5. The invention according to claim 4 wherein said escapement means comprises a shoulder formed by said lever adapted to engage a portion of said rack.

6. The invention according to claim 1 wherein said first mentioned means comprises a reciprocally movable gear rack having a toothed portion for driving a gear connected to said shutter, said rack further having a projection adapted upon movement of said rack to urge the shutter blades into their open position; said switch comprises a pair of spaced apart contacts, one of which is mounted on a spring member constantly tending to separate the contacts; and said second mentioned means comprises a movable lever having a shoulder adapted to engage a portion of said rack when said lever is in said first position for stopping said rack and shutter run down upon release of the shutter when the shutter blades are in their closed position, said lever further having a portion thereof in engagement with said spring member and another portion engageable by said flap as it is urged into its inoperative position for moving said lever into its second position.

7. In a switch control device for a single lens reflex camera of the type having a shutter provided with shutter blades movable between open and closed positions and adapted during the shutter run down to move into the closed position and then to open and close the shutter blades to make an exposure, and a flash synchronizing mechanism associated with said shutter, the combination comprising: means for simultaneously cocking said shutter and moving said shutter blades to their open position; a switch electrically connected to said flash synchronizing mechanism; means associated with said first mentioned means and said switch and movable between a normal first position, in which said switch is open and said first mentioned means is adapted upon release of said shutter to stop said shutter blades in their closed position, and a second position in which said switch is closed and said first mentioned means is released permitting said shutter to continue its run down opening and closing the shutter blades to make an exposure; and means for moving said second mentioned means to its second position upon release of said shutter.

8. The invention according to claim 7 wherein said first-mentioned means comprises a reciprocally movable gear rack.

9. The invention according to claim 7 wherein said rack drives a gear for cocking said shutter, and further has a projection adapted upon movement of said rack to urge the shutter blades into their open position.

10. The invention according to claim 7 wherein said second mentioned means comprises a movable lever having escapement means for stopping said first mentioned means upon release of said shutter when said shutter blades are in their closed position, said movable lever further having a portion thereof in engagement with said switch and another portion thereof adapted to be engaged by said flap.

11. The invention according to claim 10 wherein said escapement means comprises a shoulder formed by said lever adapted to engage a portion of said rack.

12. The invention according to claim 7 wherein said last recited means comprises a spring biased movable lever.

13. The invention according to claim 1 wherein said first mentioned means comprises a reciprocally movable gear rack having a toothed portion for driving a gear connected to said shutter, said rack further having a projection adapted upon movement of said rack to urge the shutter blades into their open position; said switch comprises a pair of spaced apart contacts, one of which is mounted on a spring member constantly tending to separate the contacts; and said second mentioned means comprises a movable lever having a shoulder adapted to engage a portion of said rack when said lever is in said first position for stopping said rack and shutter run down upon release of the shutter when the shutter blades are in their closed position, said lever further having a portion thereof in engagement with said spring member and another portion engageable by said flap as it is urged into its inoperative position for moving said lever into its second position.

References Cited in the file of this patent

UNITED STATES PATENTS 2,006,007    Zimmer _____ June 25, 1935